(12) United States Patent
Müller (10) Patent No.: US 9,696,713 B2
(45) Date of Patent: Jul. 4, 2017

(54) METHOD FOR GRINDING MACHINING OF BEVEL GEARS IN THE SINGLE-INDEXING METHOD

(71) Applicant: Klingelnberg AG, Zürich (CH)

(72) Inventor: Hartmuth Müller, Remscheid (DE)

(73) Assignee: KLINGELNBERG AG (CH)

( * ) Notice: Subject to any disclaimer, the term of this patent is extended or adjusted under 35 U.S.C. 154(b) by 328 days.

(21) Appl. No.: 14/670,885

(22) Filed: Mar. 27, 2015

(65) Prior Publication Data

US 2015/0286206 A1 Oct. 8, 2015

(30) Foreign Application Priority Data

Mar. 27, 2014 (EP) .................................... 14162022

(51) Int. Cl.
| | |
|---|---|
| *B23F 9/02* | (2006.01) |
| *B23F 23/12* | (2006.01) |
| *G05B 19/402* | (2006.01) |
| *B23Q 17/20* | (2006.01) |
| *B23F 19/02* | (2006.01) |
| *G05B 19/406* | (2006.01) |
| *B23Q 17/00* | (2006.01) |

(52) U.S. Cl.
CPC .............. *G05B 19/402* (2013.01); *B23F 9/02* (2013.01); *B23F 9/025* (2013.01); *B23F 19/025* (2013.01); *B23F 23/12* (2013.01); *B23F 23/1218* (2013.01); *B23Q 17/20* (2013.01); *G05B 19/406* (2013.01); *B23Q 2017/001* (2013.01); *G05B 2219/36196* (2013.01); *G05B 2219/37367* (2013.01)

(58) Field of Classification Search
CPC ............... G05B 19/402; G05B 19/406; G05B 2219/36196; G05B 2219/37367; B23F 9/025; B23F 19/025; B23F 23/12; B23F 23/1218; B23Q 17/20; B23Q 2017/001
USPC ................... 451/47, 57, 147, 219, 253, 900
See application file for complete search history.

(56) References Cited

U.S. PATENT DOCUMENTS

| | | | | |
|---|---|---|---|---|
| 1,405,878 | A | * | 2/1922 | Torrance .................. B02C 7/06 241/202 |
| 2,032,269 | A | * | 2/1936 | Einstein .................. B24B 5/185 451/140 |
| 2,713,277 | A | * | 7/1955 | Kaul ....................... B21K 1/30 29/893.34 |

(Continued)

FOREIGN PATENT DOCUMENTS

| | | |
|---|---|---|
| DE | 19517360 C1 | 5/1996 |
| EP | 0022586 A1 | 1/1981 |

*Primary Examiner* — Eileen Morgan
(74) *Attorney, Agent, or Firm* — McCarter & English, LLP (57) ABSTRACT

A method for grinding bevel gears (1), wherein a first grinding tool (2) is used during a first method section and a second grinding tool is used during a second method section. A measurement system (30) is used to carry out a measuring procedure, in which sampling values can be ascertained for at least a part of first flanks of the bevel gear workpiece (1), which enable a statement about the concentricity error of this bevel gear workpiece (1) in the present chucking. Concentricity correction dimensions are ascertained by computer on the basis of the sampling values, and an adaptation of machining movements of the second method section is performed on the basis of the concentricity correction dimensions.

14 Claims, 5 Drawing Sheets

(56) References Cited

U.S. PATENT DOCUMENTS

| | | | | |
|---|---|---|---|---|
| 4,388,781 A * | 6/1983 | Dodd | ................ | B23F 21/023 |
| | | | | 409/27 |
| 4,467,567 A * | 8/1984 | Konersmann | ......... | B23F 19/002 |
| | | | | 451/211 |
| 5,136,522 A * | 8/1992 | Loehrke | ............... | G05B 19/186 |
| | | | | 451/21 |
| 5,297,055 A * | 3/1994 | Johnstone | ............... | B23F 23/12 |
| | | | | 700/195 |
| 6,033,287 A * | 3/2000 | Wiener | .................. | B23F 9/025 |
| | | | | 451/161 |
| 6,481,307 B1 * | 11/2002 | Klingelnberg | .......... | B23F 9/025 |
| | | | | 74/459.5 |
| 2006/0240746 A1 * | 10/2006 | Bittner | ...................... | B23F 5/16 |
| | | | | 451/5 |
| 2012/0209418 A1 * | 8/2012 | Winkel | ............... | B23F 23/1218 |
| | | | | 700/159 |
| 2013/0047390 A1 * | 2/2013 | Ongaro | ............... | B23Q 39/026 |
| | | | | 29/27 C |

* cited by examiner

Prior Art

Fig. 1A

Prior Art

METHOD FOR GRINDING MACHINING OF BEVEL GEARS IN THE SINGLE-INDEXING METHOD

CROSS-REFERENCE TO RELATED APPLICATION

This application claims priority under 35 U.S.C. §§119(a)-(d) to European Patent Application No. EP 14 162 022.9, filed Mar. 27, 2014, which is hereby incorporated by reference in its entirety as part of the present disclosure as if fully set forth herein.

FIELD OF THE INVENTION

The invention relates to methods for machining bevel gears using two grinding tools in the single-indexing method.

BACKGROUND OF THE INVENTION

It is known that bevel gears can be machined using a grinding tool. So-called cup grinding wheels are frequently used in this case.

In the grinding of bevel gears, a differentiation is made between so-called grinding in the plunging method for non-generated gear teeth and grinding in the rolling method for generated gear teeth.

During the grinding of spiral-toothed bevel gears, the concave tooth flank of a tooth gap is created with the outer circumferential surface and the convex tooth flank of the tooth gap is created with the inner circumferential surface of a cup grinding wheel. If this is performed in two-flank cutting, also called completing, which is typical in the case of plunging grinding of crown gears, but also in the generating of pinions, both tooth flanks of the tooth gap are thus ground simultaneously. In single-flank grinding or single-sided methods, in contrast, either only the concave or only the convex tooth flanks of the tooth gap are ground.

Figure 1A:
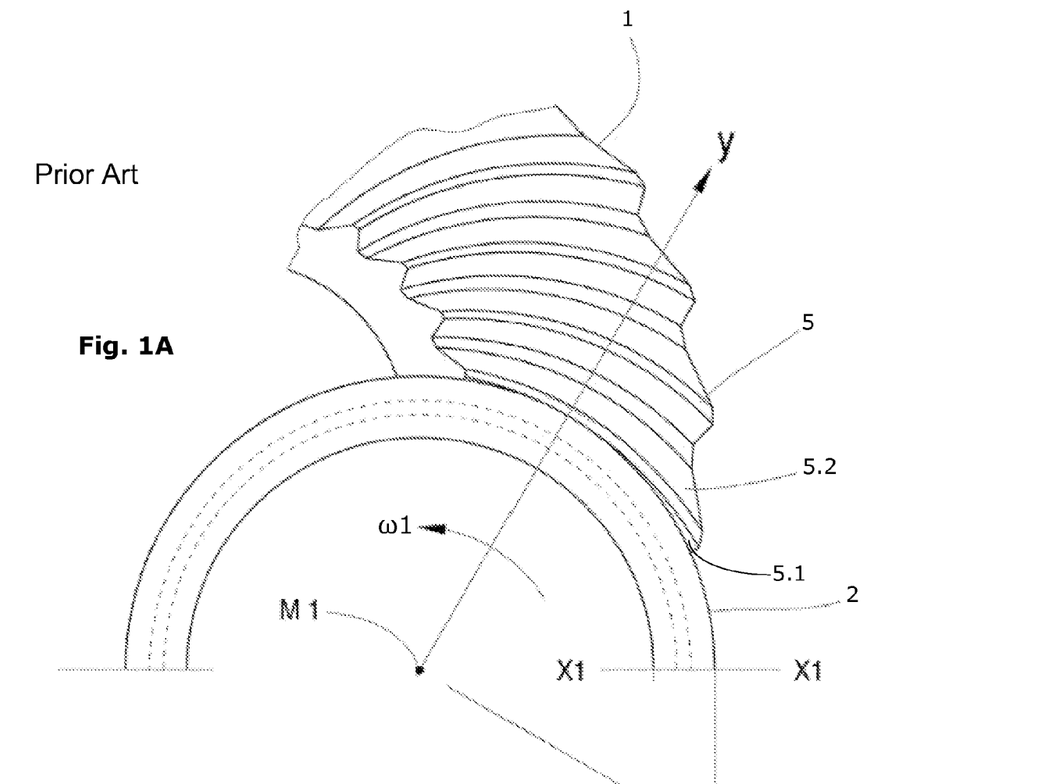
FIG. 1A shows a very schematic view of a cup grinding wheel, which is mounted in a known way and which machines a concave flank of a tooth gap of a crown gear workpiece.

FIG. 1A shows a schematic illustration of an approach in which a cup grinding wheel 2 rotates about a wheel center point M1. The axis of rotation R1 of the tool spindle (not shown) is perpendicular to the plane of the drawing and extends through the wheel center point M1. The rotation of the cup grinding wheel 2 about the axis of rotation R1 is identified in FIG. 1A with $\omega 1$. The corresponding axial drive is identified hereafter with A1. At the moment shown, a concave tooth flank 5.1 of the workpiece 1 is being ground.

Figure 1B:
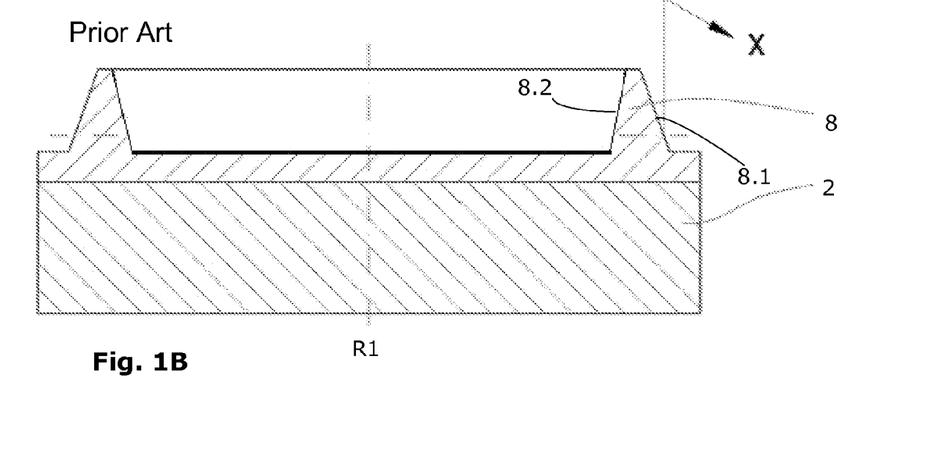
FIG. 1B shows a very schematic sectional view of the cup grinding wheel according to FIG. 1A along section line X1-X1.

FIG. 1B shows a schematically simplified section along line X1-X1 through a part of the cup grinding wheel 2, wherein rounded areas of the corners, which are necessary in practice and are also present, are not shown. The asymmetrical profile 8 of the cup grinding wheel 2 can be seen in FIG. 1B. The outer flank on the outer circumference 8.1 of the cup grinding wheel 2 is used to grind the concave tooth flanks 5.1 of the workpiece 1. The inner flank on the inner circumference 8.2 of the cup grinding wheel 2 is used to grind the convex tooth flanks 5.2 of the workpiece 1.

There are areas of application in which the demands on the quality of the bevel gears are particularly high. The expenditure for producing such bevel gears is correspondingly large and the machines used must fulfill numerous criteria.

So-called dual-spindle grinding machines are frequently used in single-flank grinding, which, as the name already indicates, have two tool spindles for accommodating one grinding tool each. In such a dual-spindle grinding machine, a workpiece in a chuck can firstly have the concave flanks be machined using a first grinding tool and subsequently have the convex flanks be machined using a second grinding tool, for example. Because re-chucking of the workpiece is not necessary, gearwheels of high quality can be produced. Since the workpiece does not have to be re-chucked, the concentricity error during the machining using the first grinding tool and subsequently during the machining using the second grinding tool is identical.

Such dual-spindle grinding machines are usually very specialized machines, which are costly, on the other hand, and which are not flexibly usable for other machining methods, on the other hand.

The demand exists for also being able to produce bevel gears having comparable quality on so-called single-spindle grinding machines. Unfortunately, this has heretofore not been possible or has only been possible with great effort on a single-spindle grinding machine. In addition, in a single-spindle grinding machine, a change from a first grinding tool to a second grinding tool must be completed, which requires a refitting time, during which the machine is not usable.

SUMMARY OF THE INVENTION

Therefore, the invention enables a single-spindle grinding machine to be optimized so that it is designed for productive and high-quality machining of bevel gears. The quality of the machined bevel gears is comparable to the quality of bevel gears machined on dual-spindle grinding machines.

In a method for grinding bevel gears, a first grinding tool is used during a first method section and a second grinding tool is used during a second method section. In some embodiments, multiple bevel gears are successively subjected to the first method section. This means that these bevel gears are unchucked and are re-chucked before the second method section. A measurement system is used to carry out a measuring procedure, in which sampling values can be ascertained for at least a part of first flanks of the bevel gear workpiece, which enable a statement about the concentricity error of this bevel gear workpiece in the present (renewed) chucking. Concentricity correction dimensions are ascertained by computer on the basis of the sampling values, and an adaptation of machining movements of the second method section is carried out on the basis of the concentricity correction dimensions.

Reference is made in general here to grinding tools, although in the specific case they are usually cup grinding wheels or conical grinding tools, which are coated with abrasives.

In some embodiments a method is used, which is designed for grinding bevel gears, such as spiral-toothed bevel gears, wherein a first grinding tool is used during a first method section and a second grinding tool is used during a second method section. The method comprises the following steps, which do not all have to be executed in the specified sequence.

a) fastening (chucking) the first grinding tool on a tool spindle of a grinding machine, b) fastening (chucking) a first workpiece on a workpiece spindle of the grinding machine, c) CNC-controlled performance of a first single-indexing grinding procedure (in the scope of the first method section) using the first grinding tool, wherein all first tooth flanks of the first workpiece are machined by grinding step-by-step in the scope of the first single-indexing grinding procedure, d) separating (unchucking) the first workpiece from the tool spindle.

At a later point in time, the first workpiece is again fastened on the workpiece spindle of this or another grinding machine and the second grinding tool is fastened on the tool spindle of this or the other grinding machine (i.e., this approach can also be transferred to a second grinding machine), and the following further steps follow:
i) performance of a measurement procedure, in which a sensor of the grinding machine is used to ascertain sampling values for at least a part of the first flanks, which enable a statement about the concentricity error in this re-chucking of the first workpiece,
ii) calculative (e.g., computer-controlled) ascertainment of concentricity correction dimensions,
iii) CNC-controlled performance of a second single-indexing grinding procedure (second method section) using the second grinding tool, wherein all second tooth flanks of the first workpiece are machined by grinding step-by-step in the scope of the second single-indexing grinding procedure, and wherein an adaptation of the machining movements of the second single-indexing grinding procedure is performed on the basis of the concentricity correction dimensions.

In some aspects, the concentricity correction dimensions comprise specifications or dimensions, which enable the second flank to be ground with the same concentricity error (with respect to the size and location) as the first flank.

In some embodiments, the machining in the scope of the second single-indexing grinding procedure is performed with application of machine settings adapted on the basis of the concentricity correction dimensions.

The concentricity errors of the right and the left flanks can each be roughly described by a periodic concentricity error curve, for example. Without the use of the invention, the concentricity errors (or the two periodic concentricity error curves, respectively) can be unfavorably superimposed on one another (i.e., with unfavorable phasing), which can result in significant tooth thickness errors, unfavorable running behavior, and not achieving the specified quality on the workpiece. The invention prevents this.

In some embodiments, a correction of the machine settings is performed with use of the concentricity correction dimensions for each of the gaps, which are to be machined in the scope of the second single-indexing grinding procedure.

In some embodiments, the concentricity error of each bevel gear workpiece in the re-chucked state is ascertained by the use of the measurement procedure, before the second single-indexing grinding procedure begins. To be able to adapt the concentricity error, during the execution of the second single-indexing grinding procedure, an artificial concentricity error is more or less applied or superimposed on the concentricity error of the re-chucking, to thus be able to compensate (on-the-fly) as a whole for the concentricity error by changed machine settings.

The concentricity error, which has resulted from the first single-indexing grinding procedure in the first chucking, can be described by a periodic concentricity error curve, which is at an angle reference to a complete revolution about the workpiece axis. This means that this concentricity error curve has a specific phasing. During the re-chucking of the workpiece in the machine, it would only be possible with extremely large effort to perform the exactly identical chucking with identical concentricity error again. In practice, a different concentricity error results upon the re-chucking. This other concentricity error can again be described by a periodic concentricity error curve. The first concentricity error curve, which has resulted from the first single-indexing grinding procedure, and the second concentricity error curve, which would result from the second single-indexing grinding procedure, have a different phasing (with respect to a rotation about the workpiece axis). An artificial concentricity error is applied or superimposed on the concentricity error of the re-chucking, to adapt it to the concentricity error of the first machined flank.

Accordingly, an adaptation of the concentricity error of the second flanks in relation to the concentricity error of the first flanks can be performed by changing/adapting the machine settings in the scope of the second single-indexing grinding procedure.

The invention therefore enables bevel gears to be ground in a discontinuous single-indexing grinding method in a single-spindle grinding machine (or in two single-spindle grinding machines), wherein errors which result from chucking a workpiece two times can be compensated for. By way of the use of the invention, tooth thickness errors, which previously would have resulted in such a configuration, can be prevented or significantly reduced.

The invention may be used in a CNC-controlled single-spindle grinding machine, which comprises a computer for ascertaining the concentricity correction dimensions, or which is connectable to a computer, which is designed for ascertaining the concentricity correction dimensions.

The invention may be used for the fine machining of previously toothed work pieces.

If the invention is applied in the plunging grinding of crown gears, it is thus sufficient to correct the plunging of the grinding tool in relation to each tooth gap on the workpiece (for example, not plunge it in as far) during the second single-indexing grinding procedure. In the generating grinding of pinions, in contrast, the movement sequences are more complicated and multiple machine settings/movement sequences have to be adapted tooth gap by tooth gap.

According to some embodiments, for example, a device can be used, which comprises at least one machine having a workpiece spindle for accommodating a bevel gear workpiece (such as a spiral bevel gear workpiece), a tool spindle for accommodating a grinding wheel, and multiple drives for machining the bevel gear workpiece. The machine is designed so that, during the machining of the bevel gear workpiece, the grinding wheel executes a rotation about the axis of rotation of the tool spindle and the grinding wheel engages in the bevel gear workpiece to remove material. The machine furthermore comprises a measuring system (for example, having tactile measuring sensor, which can be fed into tooth gaps of a workpiece chucked in the machine), wherein the measuring system is designed to ascertain a concentricity error by the sampling/scanning of multiple tooth flanks of the workpiece. Furthermore, the machine comprises a computer or an interface to a computer, which is designed to ascertain (calculate) concentricity correction dimensions. The machine is designed to carry out a first single-indexing grinding procedure step-by-step by grinding on all first tooth flanks of a first workpiece, wherein the corresponding first machine settings are predefined by a CNC controller of the machine. The machine is furthermore designed to carry out a second single-indexing grinding procedure step-by-step by grinding on all second tooth flanks of the first workpiece, wherein the corresponding second machine settings are predefined in consideration of the concentricity correction dimensions by a CNC controller of the machine.

In some embodiments, the first machine settings for the grinding machining of structurally identical gear wheels of a first production batch are all identical. The second machine settings for the grinding machining of the structurally-identical gear wheels of the first production batch in the scope of the second single-indexing grinding procedure can be different for each gearwheel of the batch, however. This results from the fact that each of these gearwheels can have a different concentricity error upon the re-chucking.

Other objects and advantages of the present invention will become apparent in view of the following detailed description of embodiments of the invention and the accompanying drawings.

DETAILED DESCRIPTION OF EMBODIMENTS OF THE INVENTION

Terms are used in conjunction with the present description are also used in relevant publications and patents. However, it is to be noted that the use of these terms is only to serve for better understanding. The inventive ideas and the scope of protection of the claims for protection are not to be restricted in the interpretation by the specific selection of the terms. The invention may readily be transferred to other term systems and/or technical fields. The terms are to be applied accordingly in other technical fields.

Figure 2:
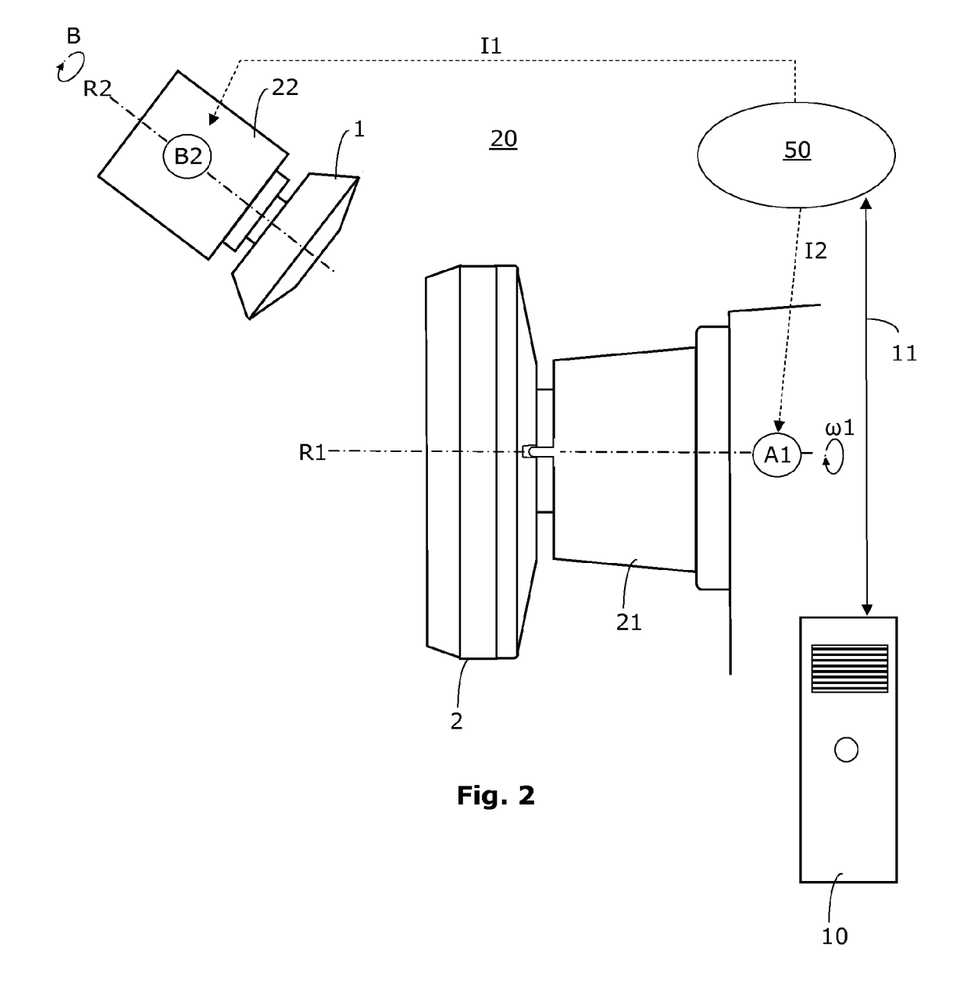
FIG. 2 shows a schematic view of a part of a first grinding machine, having a cup grinding wheel which is mounted so it is rotatable on a tool spindle, and having a bevel gear workpiece to be machined, which is mounted so it is rotatable on a workpiece spindle, wherein the cup grinding wheel and the bevel gear workpiece are not engaged at the moment shown.

A device 20, comprises, as schematically shown in FIG. 2, a workpiece spindle 22, which is designed to accommodate a bevel gear workpiece 1 (in the form of a stylized crown wheel here). In addition, it comprises a tool spindle 21 for accommodating a grinding tool 2 (in the form of a cup grinding wheel here) and multiple drives (for example, B1, B2, and further drives, which are not shown in the figures) for machining the bevel gear workpiece 1. The grinding tool 2 executes a rotation $\omega 1$ about the axis of rotation R1 of the tool spindle 21 during the machining of the bevel gear workpiece 1. The grinding tool 2 engages in the bevel gear workpiece 1, as shown in FIG. 1A on the basis of a spiral-toothed crown gear, for example, to remove material. Since it is a so-called single-indexing grinding method, the bevel gear workpiece 1 executes an indexing rotation B about the axis of rotation R2 after each machining of a flank of a tooth gap. It is thus a discontinuous method. Thus, for example, all concave flanks 5.1 of all teeth 5 are machined step-by-step (see FIG. 1A). Furthermore, a CNC controller 50 is shown, which is designed to control the movement sequences in the machine 20, as indicated by the control signals I1, I2.

Furthermore, a computer 10 is shown, which is especially designed (programmed) to ascertain and/or calculate concentricity correction dimensions. The computer 10 is connected for communication to the machine 20 and/or the controller 50, as indicated in FIG. 2 by the connection 11. The computer 10 does not necessarily have to be embodied as a complete computer in various embodiments of the invention. A computer module, a chip module, or a plug-in card having processor or the like can also be used. The computer 10 can also be part of the controller 50, or the controller 50 can be part of the computer 10.

Figure 3:
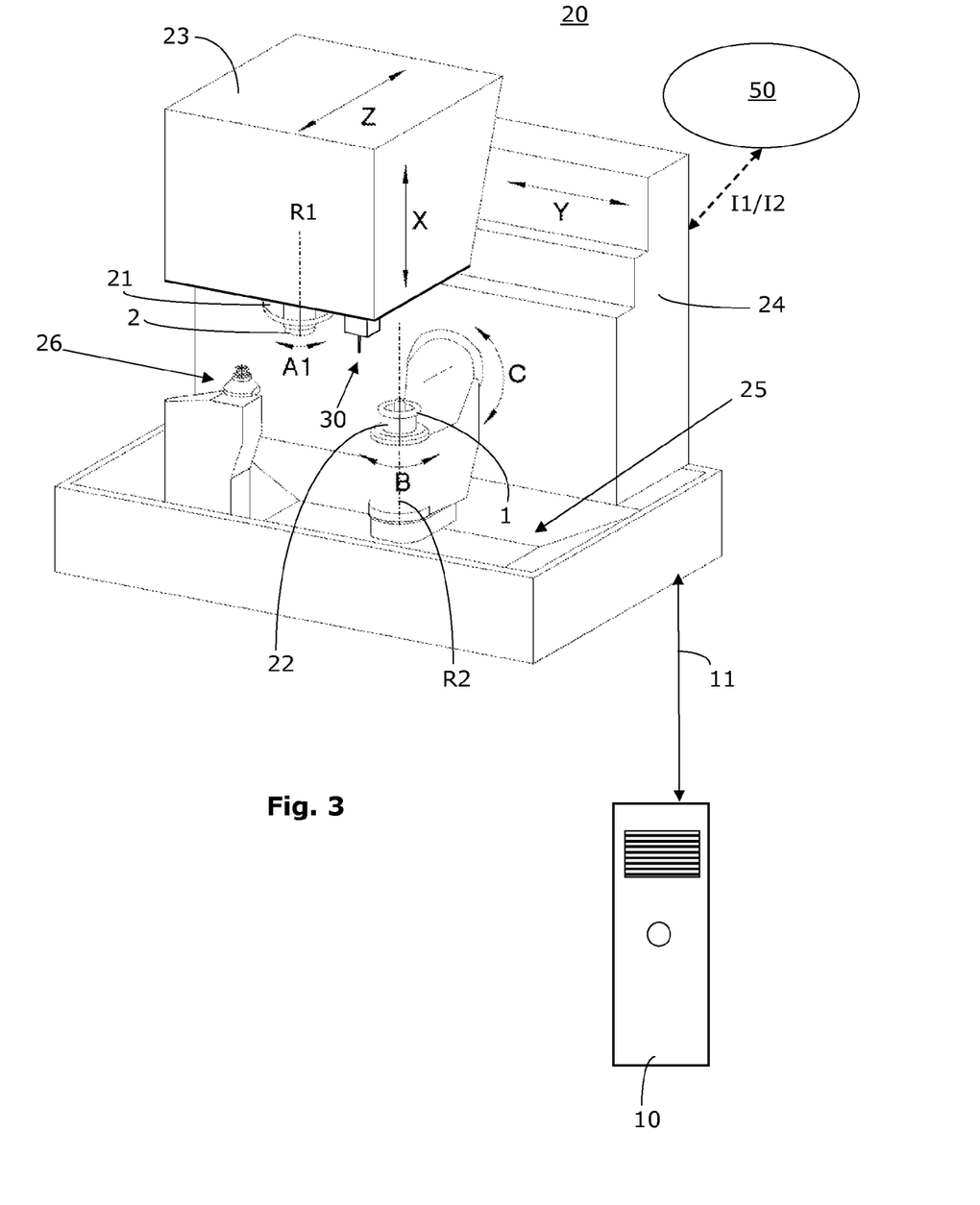
FIG. 3 shows a simplified perspective view of a second grinding machine having a cup grinding wheel which is arranged suspended, and which is mounted so it is rotatable on a tool spindle, and having a bevel gear workpiece to be machined, which is mounted so it is rotatable on a workpiece spindle, wherein the cup grinding wheel and the bevel gear workpiece are not engaged at the moment shown.

FIG. 3 shows a perspective view of a second grinding machine 20 having a cup grinding wheel 2, which is arranged suspended, and which is mounted so it is rotatable on a tool spindle 21, and having a bevel gear workpiece 1 to be machined, which is mounted so it is rotatable on a workpiece spindle 22, wherein the cup grinding wheel 2 and the bevel gear workpiece 1 are not engaged at the moment shown. The statements that were previously made with reference to the computer 10 are also to be applied here.

The single-spindle grinding machine 20 shown as an example in FIG. 3 furthermore comprises a tool carriage 23, which is mounted so it is displaceable on a machine stand 24 in parallel to the linear axis Y and the linear axis Z. The machine 20 has a further linear axis, which is referred to as the X axis. In addition, this machine 20 comprises a pivot axis C, which enables pivoting of the workpiece spindle 22 together with workpiece 1. In the example shown, the machine 20 has a collection region 25 for chips and a dressing unit 26 that can be used for the CNC-controlled dressing/profiling of the grinding tool 2. These components are optional. Furthermore, a CNC controller 50 is shown, which is designed to control the movement sequences in the machine 20, as indicated by the control signals I1, I2. A computer 10 can also be part of the controller 50, or the controller 50 can be part of a computer 10, in this embodiment.

The machine 20 may be equipped with a tactile measuring sensor 30, as indicated in FIG. 3. The machine 20 can also comprise another measuring system (for example, an optical measuring system), however, which is designed to ascertain the concentricity error of the gear teeth by measurements on the re-chucked workpiece 1.

The measuring system may be designed to sample or measure the tooth flanks (for example, the concave flanks 5.1), to ascertain the concentricity error on the re-chucked workpiece 1 therefrom or to ascertain (measurement) variables, which are correlated with the concentricity error.

If a tactile measuring sensor 30 is used, it can thus be a scanning measuring sensor 30 or it can be a switching measuring sensor.

The measuring system can be arranged on the machine 20 so that the measuring sensor 30 (or, for example, an optical sensor or a CCD element) is moved together with the main axes X, Y, Z of the machine 20.

In some embodiments, the measuring system can be arranged on the machine 20 so that the measuring sensor 30 (or, for example, an optical sensor or a CCD element) has separate movement axes. In some embodiments, a combination is also possible, in which the measuring sensor 30 (or, for example, an optical sensor or a CCD element) partially has separate movement axes and is partially oriented to the main axes of the machine 20.

The machine 20 may be equipped with a precision measuring instrument as a measuring system.

The single-spindle grinding machine 20 of FIG. 3 is especially designed for grinding spiral-toothed bevel gears.

Figure 4A:
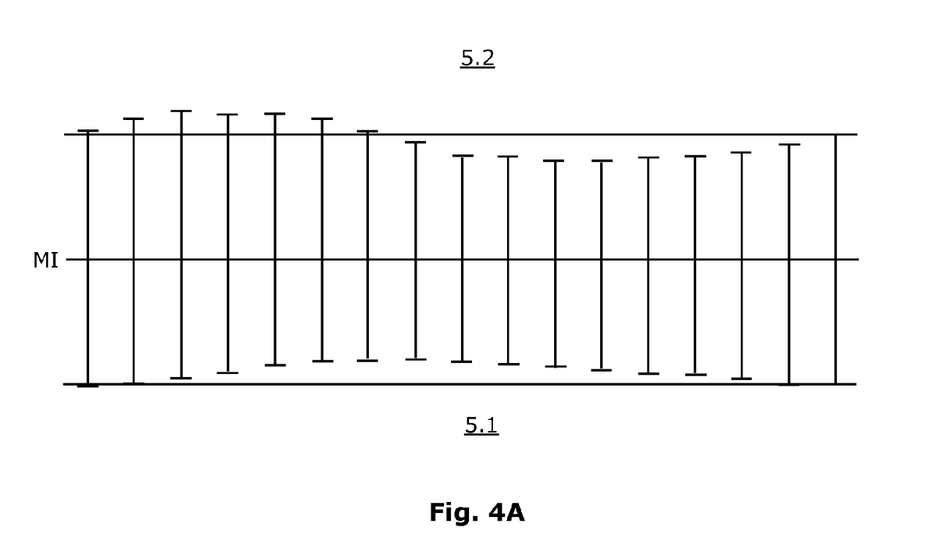
FIG. 4A shows a graphic illustration of the total deviation of the tooth gaps of a bevel gear, wherein the deviation of the convex flanks are shown on top and the deviation of the concave flanks are shown on the bottom in the illustration.

FIG. 4A shows a graphic illustration of the total deviation of the tooth gaps of a bevel gear, wherein the deviations of the convex flanks 5.2 are shown on top and the deviations of the concave flanks 5.1 are shown on the bottom in the illustration. MI represents the center line. This total deviation was ascertained by means of a measuring system on a workpiece, which was subjected in a first chucking in a machine to a first single-indexing grinding procedure. In the scope of the first single-indexing grinding procedure, all convex flanks 5.2 of the workpiece were machined step-by-step here. After removal of the workpiece from the machine and after re-chucking of the workpiece in the machine, all concave flanks 5.1 of the workpiece were subjected to a second single-indexing grinding procedure. In the scope of this second single-indexing grinding procedure, all concave flanks 5.1 of the workpiece were machined step-by-step here.

In this example, no adaptation of the concentricity error was performed.

Figure 4B:
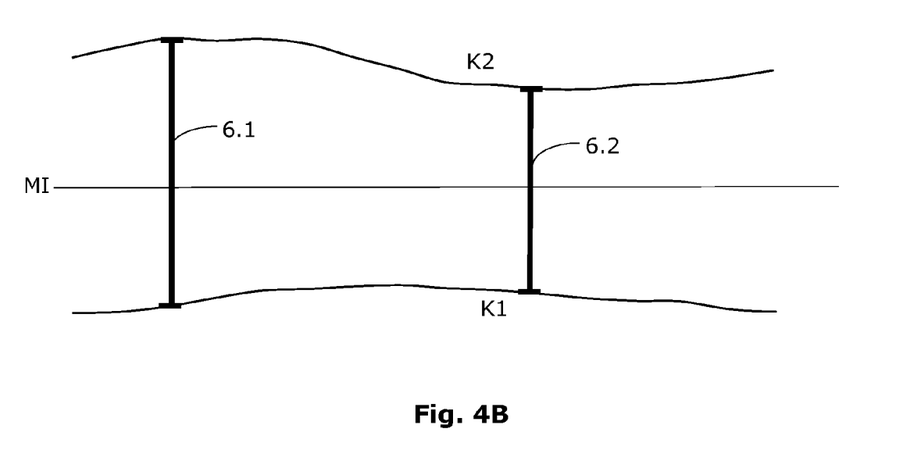
FIG. 4B shows a graphic illustration of two curve sequences, wherein the curve sequence of the convex flanks is shown on top and the curve sequence of the concave flanks is shown on the bottom in the illustration.

FIG. 4B shows a graphic illustration of two curve sequences K1, K2, wherein the curve sequence K2 of the convex flanks 5.2 is shown on top and the curve sequence K1 of the concave flanks 5.1 is shown on the bottom in the illustration. The center line MI and the location/the profile of the two curve sequences K1, K2 were taken from FIG. 4A.

The two curve sequences K1, K2, or the concentricity error curves, respectively, have the profile of a periodic curve or they can be derived, for example, from a sine curve. It can be inferred from FIG. 4B that the phasing of the curve sequence K1 is shifted in relation to the phasing of the curve sequence K2. This results from the fact that the concentricity error in the first chucking of the workpiece is different from the concentricity error of the workpiece in the second re-chucking. The exactly identical concentricity error will be predefined upon the re-chucking as in the first chucking only in a few cases.

Two tooth gaps 6.1 and 6.2 are shown as examples in FIG. 4B. The length of the respective line sections corresponds to the gap width of the respective tooth gaps 6.1, 6.2. Because the two curve sequences K1, K2 do not run in phase, in an unfavorable case, as shown in FIGS. 4A and 4B, a large variation of the gap widths can result. Such variations of the gap width, or the tooth thickness, which has a direct relationship thereto, is not acceptable for many applications.

It is to be noted that the illustrations of FIGS. 4A to 5B are exaggerated. They only show the respective deviations with respect to the center line MI.

Figure 5A:
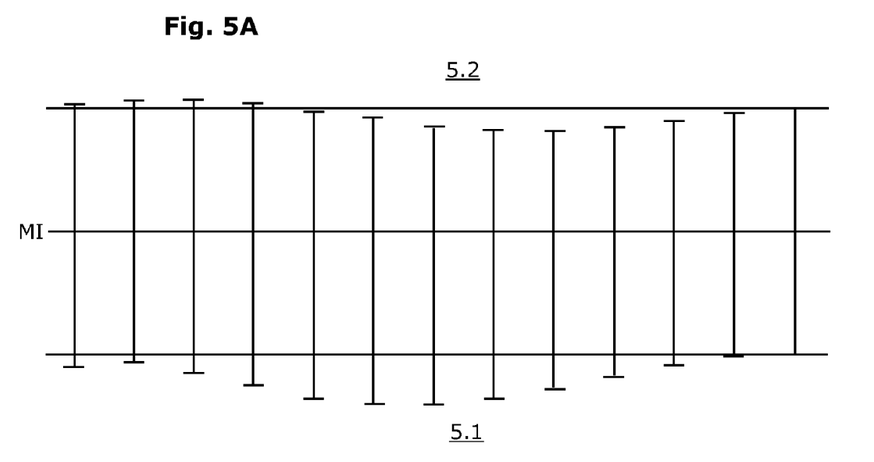
FIG. 5A shows a graphic illustration of the total deviation of the tooth gaps of a bevel gear which was machined according to an embodiment of the invention, wherein the deviations of the convex flanks are shown on top and the deviations of the concave flanks are shown on the bottom in the illustration.

FIG. 5A shows a graphic illustration of the total deviation of the tooth gaps of a bevel gear 1. The deviations of the convex flanks 5.2 are shown on top and the deviations of the concave flanks 5.1 are shown on the bottom in the illustration. The total deviation was ascertained by means of a measuring system on a workpiece 1, which was subjected in a first chucking in a machine 20 to a first single-indexing grinding procedure. In the scope of the first single-indexing grinding procedure, all convex flanks 5.2 of the workpiece 1 were machined step-by-step here. After removal of the workpiece 1 from the machine 20 and after re-chucking of the workpiece 1 in the machine 20, all concave flanks 5.1 of the workpiece 1 were subjected to a second single-indexing grinding procedure. Previously, however, a measurement of the concentricity error or of (measured) dimensions, which are correlated with the concentricity error, was performed by a measuring system of the machine 20.

According to some embodiments, this measurement is performed after the re-chucking of the workpiece 1 on those flanks of the workpiece 1 that were machined in the scope of the first single-indexing grinding procedure.

After concentricity correction dimensions for this workpiece 1 were ascertained by computer (e.g., in a computer-controlled manner), the CNC-controlled performance of the second single-indexing grinding procedure was performed using the second grinding tool. In the scope of the second single-indexing grinding procedure, all second tooth flanks of the first workpiece 1 were machined by grinding step-by-step, and adaptations of the machining movements of the second single-indexing grinding procedure were performed in this case on the basis of the concentricity correction dimensions.

Figure 5B:
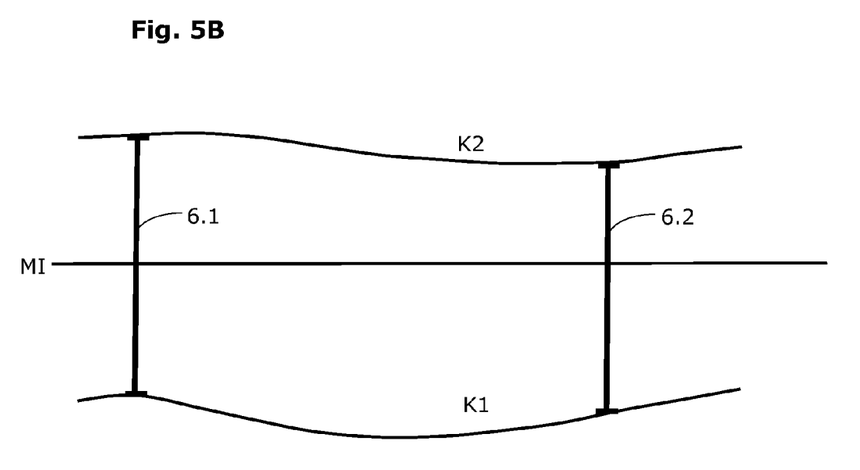
FIG. 5B shows a graphic illustration of two curve sequences, wherein the curve sequence of the convex flanks is shown on top and the curve sequence of the concave flanks is shown on the bottom in the illustration.

FIG. 5B shows a graphic illustration of two curve sequences K1, K2, or concentricity error curves, respectively, wherein the curve sequence K2 of the convex flanks 5.2 is shown on top and the curve sequence K1 of the concave flanks 5.1 is shown on the bottom in the illustration. The center line MI and the location of the two curve sequences K1, K2 were taken from FIG. 5A.

The two curve sequences K1, K2 again have the profile of a periodic curve (they can be derived, for example, from a sinusoidal curve). It can be inferred from FIG. 5B that the phasing of the curve sequence K1 is hardly shifted in relation to the phasing of the curve sequence K2. The two curve sequences of FIG. 5B have nearly identical phasing.

Two tooth gaps 6.1 and 6.2 are shown as examples in FIG. 5B. Because the two curve sequences K1, K2 run in phase or essentially in phase, the gap widths no longer deviate significantly from one another.

It is possible to show on the basis of this example that bevel gears can also be machined by grinding, or using a machine 20 that is designed/programmed, respectively, so that in spite of the chucking and the re-chucking, they are comparable to gearwheels that were ground in a conventional manner on a dual-spindle grinding machine.

As may be recognized by those of ordinary skill in the pertinent art based on the teachings herein, numerous changes and modifications may be made to the above-described and other embodiments of the present invention without departing from the spirit of the invention as defined in the claims. Accordingly, this detailed description of embodiments is to be taken in an illustrative, as opposed to a limiting sense.

What is claimed is:

1. A method for grinding bevel gears comprising:
   a) fastening a first grinding tool on a tool spindle of a grinding machine,
   b) fastening a first workpiece on a workpiece spindle of the grinding machine,
   c) performing a CNC-controlled first single-indexing grinding procedure using the first grinding tool, wherein all first tooth flanks of the first workpiece are machined by grinding step-by-step during said first single-indexing grinding procedure,
   d) separating the first workpiece from the workpiece spindle,
   e) at a later point in time, re-chucking the first workpiece on the workpiece spindle of the grinding machine, which carries a second grinding tool on the tool spindle,
   f) performing a measurement procedure using a sensor of the grinding machine to obtain sampling values at least for a part of the first tooth flanks, and determining a concentricity error of the first workpiece After said re-chucking,
   g) determining concentricity correction dimensions using a computer, and
   h) performing a CNC-controlled second single-indexing grinding procedure using the second grinding tool, wherein all second tooth flanks of the first workpiece are machined by grinding step-by-step during said second single-indexing grinding procedure, and executing machining movements during the second single-indexing grinding procedure based on said concentricity correction dimensions.

2. The method according to claim 1, including applying the concentricity correction dimensions to reduce or prevent workpiece teeth thickness errors.

3. The method according to claim 1, including applying different machine settings during the first single-indexing grinding procedure than during the second single-indexing grinding procedure, wherein machine settings of the second single-indexing grinding procedure are modified by applying the concentricity correction dimensions.

4. The method according to claim 2, including applying different machine settings during the first single-indexing grinding procedure than during the second single-indexing grinding procedure, wherein machine settings of the second single-indexing grinding procedure are modified by applying the concentricity correction dimensions.

5. The method according to claim 1, wherein the first tooth flanks have a different radius of curvature than the second tooth flanks.

6. The method according to claim 2, wherein the first tooth flanks have a different radius of curvature than the second tooth flanks.

7. The method according to claim 1, wherein the bevel gears are spiral-toothed bevel gears.

8. The method according to claim 2, wherein the bevel gears are spiral-toothed bevel gears.

9. The method according to claim 1, wherein the first grinding tool and the second grinding tool are cup grinders or conical grinding tools.

10. The method according to claim 2, wherein the first grinding tool and the second grinding tool are cup grinders or conical grinding tools.

11. The method according to claim 1, wherein a first batch comprising multiple workpieces are first successively machined using said first single-indexing grinding procedure using the first grinding tool, then re-chucked successively, workpiece by workpiece, and machined using the second single-indexing grinding procedure using the second grinding tool after determining concentricity correction dimensions individually for each workpiece of the first batch.

12. The method according to claim 1, wherein a first batch comprising multiple workpieces are first successively machined using said first single-indexing grinding procedure using the first grinding tool, then re-chucked successively, workpiece by workpiece, and machined using the second single-indexing grinding procedure using the second grinding tool after determining concentricity correction dimensions individually for each workpiece of the first batch.

13. The method according to claim 1, wherein the grinding machine is a single-spindle bevel gear grinding machine.

14. The method according to claim 2, wherein the grinding machine is a single-spindle bevel gear grinding machine.

* * * * *